United States Patent [19]

Nagase et al.

[11] 4,206,056
[45] Jun. 3, 1980

[54] CONTINUOUS FILTRATION/SEPARATION APPARATUS

[75] Inventors: Hyosuke Nagase, Egawabata-cho, Nishi-ku, Nagoya-shi, Japan; Tetsuya Satoh, Narashino, Japan; Kazuo Kobayashi, Narashino, Japan; Shigeru Nojima, Narashino, Japan

[73] Assignees: Hyosuke Nagase, Nagoya; Hitachi Ltd., Tokyo, both of Japan

[21] Appl. No.: 956,398

[22] Filed: Oct. 31, 1978

[30] Foreign Application Priority Data

Dec. 9, 1977 [JP] Japan ................. 52-147103

[51] Int. Cl.² .......................................... B01D 33/08
[52] U.S. Cl. ......................... 210/391; 210/401
[58] Field of Search ............... 210/77, 81, 386, 391, 210/400, 401; 162/349

[56] References Cited

U.S. PATENT DOCUMENTS

| 3,772,144 | 11/1973 | Luthi et al. | 210/386 X |
| 3,897,341 | 7/1975 | Ozawa | 210/386 |
| 4,088,581 | 5/1978 | Carle | 210/391 |

FOREIGN PATENT DOCUMENTS 2403662 5/1975 Fed. Rep. of Germany ........... 210/386

Primary Examiner—William A. Cuchlinski, Jr.
Attorney, Agent, or Firm—Martin A. Farber

[57] ABSTRACT

A continuous filtration/separation apparatus with a part of the casing of a vane pump constructed of a filter so that material to be treated which is introduced between the casing and the vane adjacent to the rotor can be dehydrated. The endless filter of the vane pump at one portion faces the rotor of the casing and moves successively. The vane pump also has a washing device for washing the other portion of the endless filter which does not face the rotor, to eliminate clogging of the filter. A support supports an arc portion facing the rotor of the casing, which arc portion is rotatable about a center which is eccentric relative to the center of rotation of the rotor, so that the dehydrating ratio can be adjusted. A drive rotates the arc portion about its center for adjustment of the dehydration ratio.

4 Claims, 2 Drawing Figures

CONTINUOUS FILTRATION/SEPARATION APPARATUS

BACKGROUND OF THE INVENTION

This invention relates to a continuous filtration/separation apparatus used primarily for dehydrating wheat gluten or squeezing a soy sauce or bean milk, though its application is not specifically limited to foodstuffs.

There have heretofore been known continuous treating apparatuses wherein a dehydrating chamber is defined between a feed port for feeding a material to be dehydrated and a take-out port for taking out the dehydrated material and is driven by driving means from the feed port towards the take-out port and the capacity of the dehydrating chamber is gradually diminished so as to continuously dehydrate the material for treatment inside the dehydrating chamber.

These apparatuses may be divided into the following two groups; one such as disclosed in Japanese Patent Publication No. 21036/1972 which drives linearly the dehydrating chamber from the feed port to the take-out port and the other such as disclosed in Japanese Utility Model Publication No. 33751/1970 which drives the dehydrating chamber so as to describe a circle.

Among them, the present invention relates to an improvement of the continuous filtration/separation apparatus which drives the dehydrating chamber to describe especially a circle.

An excessive force would be applied to each part of the above-mentioned apparatus if a material having a small liquid content is fed. On the contrary, if a material having an extremely high liquid content is fed, the material discharged from the take-out port is not sufficiently dehydrated. Hence, the inventors of the present invention previously invented an apparatus in which the capacity of the dehydrating chamber is adjustable in order to enable one to adjust the dehydration ratio to a certain extent. This apparatus is known already as Japanese Patent Publication No. 15872/1975. However, if the invention disclosed in this Patent Publication is practised as such, it is not possible to wash the filter cloth while performing the dehydration treatment. The filter cloth must be washed to eliminate clogging and to prevent lowering of the dehydration efficiency.

In addition to the Japanese Patent Publication No. 15872/1975 mentioned above, the inventors of the present invention have also invented the means for adjusting the dehydrating ratio as described in the specification of the Japanese Patent laid-Open No. 29773/1976 and the Japanese Utility Model Laid-Open No. 21473/1977. In the Japanese Patent Laid-Open No. 29773/1976, the guide means is divided halfway, as viewed from the direction of the caterpillar movement, into two, and these divided guide means are pivoted by pins. The casing near the delivery port is pressed by the spring on the side of the rotor. This construction has the disadvantages that the caterpillar when moving past the dividing point of the casing is subjected to an excessive force. In the Japanese Utility Model Laid-Open No. 21473/1977, the guide means is moved to and from the rotor by means of the crank shaft. According to this construction, the attitude of the crank shaft is difficult to adjust and the guide means will be subjected to a large force so that it would be difficult to secure the crank shaft against undesirable movement.

SUMMARY OF THE INVENTION

The present invention contemplates to cope with the above-mentioned problem and is directed to provide a continuous filtration/separation apparatus which enables washing of the filter cloth while performing the dehydration treatment and to adjust the dehydration ratio by improving the invention disclosed in the above-mentioned Japanese Patent Publication No. 15872/1975.

Briefly stated, the apparatus of the invention has the following construction. The apparatus first includes a rotor, a caterpillar and guide means whereby the rotor is supported by a base and rotates with a first center being as its center and the guide means guides the caterpillar so that the portion of the caterpillar opposed by the rotor advances while describing an arc which has a second center as its center or a shape approximate to the arc. The second center is located at a position slightly eccentric with respect to the first center. The apparatus next includes support means supporting the guide means so that the latter is considerably turnable with the second center being as its center. The support means is supported by the base. An endless filter cloth is disposed so as to pass through the gap between the rotor and the caterpillar. In other words, the filter cloth is supported by the outer surface of the caterpillar at the portion of the caterpillar where it opposes the rotor. Grooves, holes and the like are defined on caterpillar-forming plates so as to facilitate the separation of liquid components from the material to be treated. A feed port for supplying the material for treatment is defined between the filter cloth and the rotor, and a take-out port for taking out the treated material is defined at a position of a narrower width between the rotor and the filter cloth than the position of the feed port. Side plates are provided to close at least the portion ranging from the feed port to the takeout port, as viewed from the rotating direction of the rotor, from both side portions of the rotor to both end portions of the filter cloth. The side plates may either be stationary or turnable in the direction in which the relative velocity to the rotor becomes smaller with the second center being as their center. A plurality of vanes are disposed so that they are retractile from and into the surface of the rotor and they have tips positioned close to the filter cloth and both ends positioned close to the side plates. In this instance, the term "retractile" (or retractable) should not be interpreted so narrowly. In other words, the term does not always mean that when the tips are "pulled in" or "retractile", the vanes are perfectly hidden inwardly from the surface of the rotor. Thus, the term should be interpreted to mean that the distance from the surface of the rotor to the tip of the vane is "variable".

Various means may be employed for rendering the vanes retractile from and into the surface of the rotor. For example, the portion of the vane opposed the caterpillar is restricted in its motion by the caterpillar and thus becomes retractile from and into the surface of the rotor if grooves are defined on the rotor for fitting of the vanes thereinto and a spring is interposed between the inner end of each vane and the bottom of each groove so as to impart the force acting in the radial direction to the vane. Alternatively, annular grooves may be defined on the side plates with the second center being as their center so that a part of the vanes is engaged with each annular groove.

Washing means for washing the filter cloth is disposed so as to wash it at the portion where it does not oppose the rotor. As the washing means, a water tank may be used so that the filter cloth is passed through and washed in the tank. Alternatively, spray means may be used to spray the water to the filter cloth. The apparatus further includes driving means for rotating the guide means with the second center being as its center. As the driving means, an arcuate rack may be cut on the guide means so as to let a worm supported by the support means engage with the rack, as disclosed in Japanese Patent Publication No. 15872/1975. However, the combination of the rack and the worm makes the construction complicated and retards the response for the adjustment of the dehydration ratio. For this reason, the apparatus of the invention uses a lever mechanism and a linear motion hydraulic actuator to simplify the construction and to speed up the response for the dehydration ratio adjustment in the following manner. Namely, the support point of the lever mechanism is pivoted to the base, its point of force is connected to the linear motion hydraulic actuator and its point of application is connected to the guide means so that when the linear motion hydraulic actuator is actuated, the guide means rotates with the second center as its center. It is desirable to use such a kind of hydraulic actuator which enables stopping the piston at a desired position.

The most characteristic feature of the apparatus of the present invention resides in the construction wherein the end portion of the guide means as viewed in the travelling direction of the caterpillar substantially determines the position of the take-out port. In other words, the guide means guides the caterpillar so that the gap between it and the rotor becomes wider or narrower at this end portion. This construction enables movement of the position of the caterpillar defining the position of the take-out port and to easily adjust the dehydration ratio of the material for treatment by simply moving the guide means with the second center being as its center.

Figure 1:
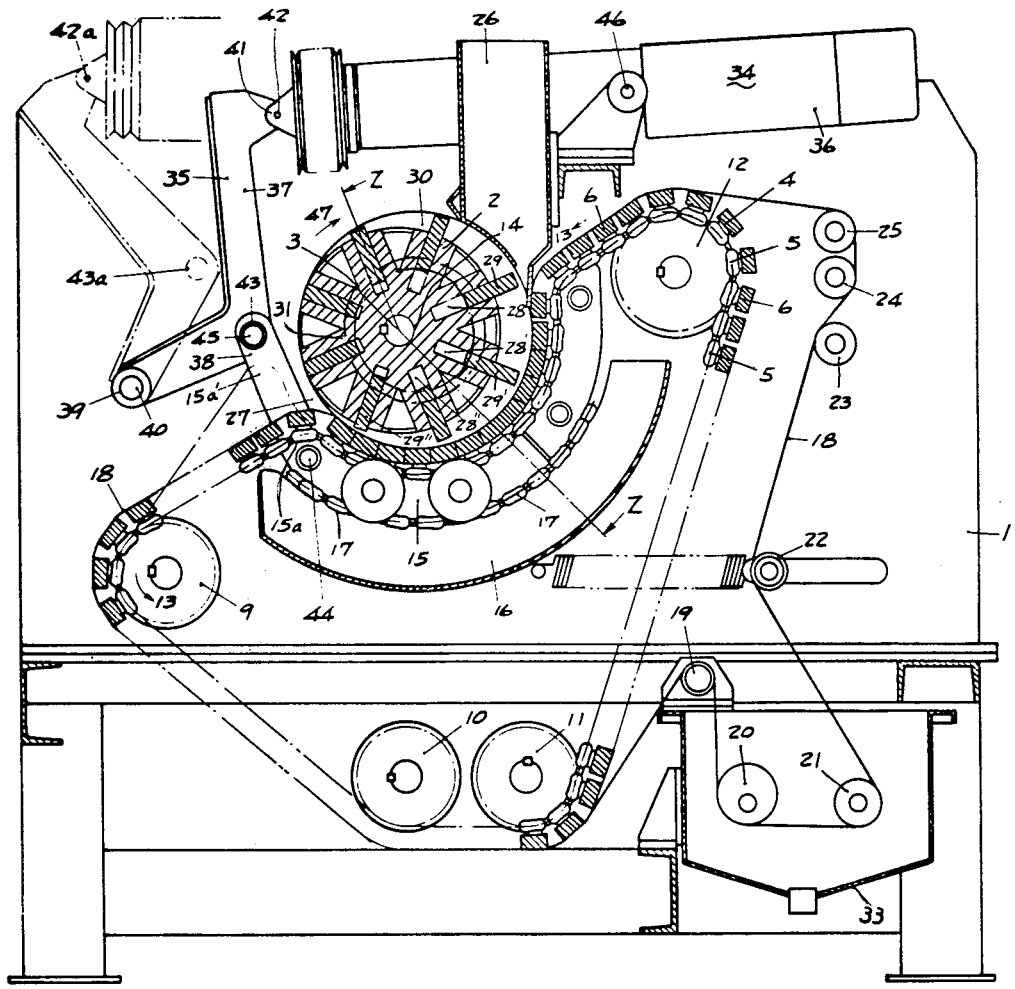
FIG. 1 is a longitudinal sectional view showing an embodiment of the continuous filtration/separation apparatus in accordance with the present invention.

In these drawings, reference numerals represent the following members, respectively;

1 ... base, 2 ... rotor, 3 ... first center, 4 ... caterpillar, 14 ... second center, 15 ... guide means, 15a ... end section of the guide means, 16 ... support means, 18 ... filter cloth, 26 ... feed port, 27 ... take-out port, 29 ... vane, 30 ... side plate, 33 ... water tank as an example of washing means, 34 ... driving means, 35 ... lever mechanism and 36 ... fluid pressure actuator.

DESCRIPTION OF PREFERRED EMBODIMENTS

Figure 2:
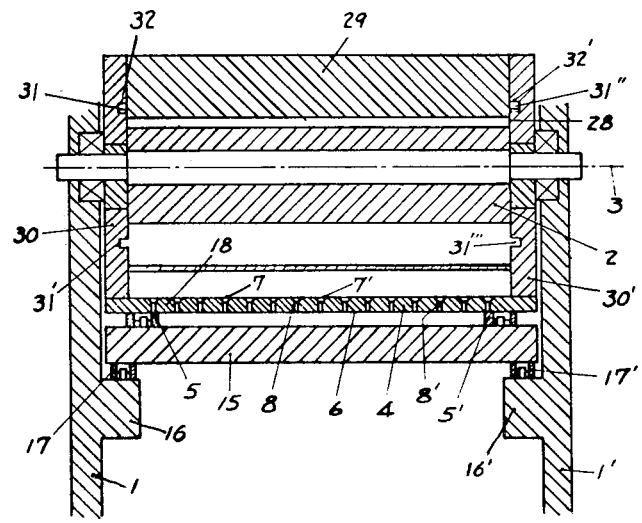
FIG. 2 is a sectional view taken along line 2—2 of FIG. 1.

Preferred embodiments of the present invention will now be explained by referring to FIGS. 1 and 2.

The base 1 supports the rotor 2 so that it is able to rotate with the first center 3 being as its center. The caterpillar 4 consists of a number of caterpillar-forming plates 6 that are mounted and secured between annular chains 5, 5' disposed on both sides thereof. A number of grooves 7 are formed on the outer surface of the caterpillar-forming plate 6 and a number of throughholes 8 are also bored on the plate to penetrate therethrough from the outside to the inside. The chain 5 is mounted to sprockets 9, 10, 11 and 12, and is driven for rotation by a variable speed motor (not shown) in the direction depicted by an arrow 13. The portion of the caterpillar 4 opposed by the rotor 2 is pivoted by the guide means 15 formed in an arcuate shape with the second center 14 being as its center. The second center 14 is positioned slightly eccentrically with respect to the first center 3.

The support means 16 is secured to the base 1 in such a manner that the guide means 15 is able to move with the second center 14 being as its center. It is advisable to interpose rollers 17 between the guide means 15 and the support means 16 in order to allow smooth movement of the guide means 15 relative to the support means 16. An endless filter cloth 18 is adapted to rollers 19-25 and its portion opposed by the rotor 2 is caused to pass through the gap between the rotor 2 and the caterpillar 4. The feed port 26 for the material for treatment is formed at the upper portion where the gap between the filter cloth 18 and the rotor 2 is wide while the take-out port 27 is disposed at the lower portion where the gap therebetween is narrower than that of the feed port. This take-out port 27 is substantially restricted by the end portion 15a of the guide means 15 as viewed in the travelling direction of the caterpillar 4. In other words, the guide means 15 guides the caterpillar 4 in such a fashion that the gap between the caterpillar 4 and the rotor 2 becomes wider or narrower in the proximity of the end portion 15a.

A plurality of grooves 28 are formed on the rotor 2 in the radial direction and plate-like vanes 29 are retractable fitted into these grooves 28, respectively. An annular groove 31 is formed on the disc-like side plate 30 with the second center 14 being as its center. Protruding sections 32 each provided on the vane 29 are fitted into this annular groove 31. The disc-like side plate 30 is allowed to rotate with the second center 14 being as its center in the direction of revolution of the rotor 2.

The filter cloth 18 is pushed to the caterpillar 4 at the portion where the guide means 15 opposes the outer circumference of the side plate 30 in order to prevent leakage of solid contents of the material for treatment from between the caterpillar 4 and the filter cloth 18 and between the filter cloth 18 and the side plate 30. A water tank 33 as washing means is disposed so that the filter cloth 18 is passed through and washed in the tank. There are also disposed a lever mechanism 35 and a linear motion hydraulic actuator 36 as driving means 34. The lever mechanism 35 consists of a lever 37 and a connection rod 38. In other words, the support point 39 of the lever 37 is pivoted to the base 1 by a pin 40 and its point of force is connected to the actuator 36 by a pin 42. The point of application 43 is connected to the guide means 15 via the connection rod 38. Two sets each of the lever mechanism 35 and the actuator 36 are disposed on both sides of the guide means 15 by pivoting one end of each connection rod 38 by a pin 44 so as not to hinder the advance of the caterpillar 4.

Reference numeral 45 represents a pin for connecting the lever 37 to the connection rod 38 and numeral 46 represents a pin for connecting the actuator 36 to the base 1.

In the apparatus having the above-described construction, the rotor 2 is rotated in the direction indicated by reference numeral 47 and the caterpillar 4 in the direction indicated by 13. The material to be treated is supplied from the feed port 26 into the dehydrating chamber defined by the rotor 2, the vanes 29, the side plates 30 and the filter cloth 18. Since the capacity of the dehydrating chamber becomes narrower as the rotor 2 advances in the direction indicated by 47, the liquid contents of the material are discharged through the filter cloth 18, the groove 7 and the holes 8 while the solid contents remaining inside the dehydrating chamber are discharged from the take-out port 27.

In order to enhance the dehydration ratio of the material for treatment, the hydraulic actuator 36 is operated and the pin 42 is moved up to the position 42a, for example, whereby the point of application of the lever 37 moves up to the position 43a, thereby causing the end portion 15a of the guide means 15 to move to the position indicated by 15a'. In consequence, the caterpillar 4 as well as the filter cloth 18 also move and the distance at the take-out port 27 from the rotor to the filter cloth becomes narrower than the width represented by the full line. It is thus possible to reduce the water content of the material for treatment discharged from the take-out port 27.

The guide means 15 may as well be moved rightwardly by operating the hydraulic actuator 35 in order to lower the dehydration ratio.

What is claimed is:

1. A continuous filtration/separation apparatus comprising;
    a rotor rotating with a first center being as its center;
    a caterpillar having a portion opposed by said rotor and rotating along the rotating direction of said rotor;
    guide means for guiding said caterpillar in such a manner that said opposed portion advances while describing at least approximately an arc having as its center a second center which is eccentric relative to said first center;
    support means for supporting said guide means such that said guide means is mounted rotatable about said second center as its center;
    an endless filter cloth passing between said rotor and said caterpillar;
    a feed port supplying a material for treatment into the gap between said filter cloth and said rotor;
    a take-out port for said material disposed at a position of a narrower width between said rotor and said filter cloth than the position of said feed port;
    side plates closing at least the portion ranging from said feed port to said take-out port, as viewed in the rotating direction of said rotor, from both side portions of said rotor to both end portions of said filter cloth;
    a plurality of vanes disposed retractably from and into the surface of said rotor and having their tips positioned close to said filter cloth and their both ends positioned close to said side plates;
    a base supporting both said rotor and said support means;
    driving means for rotating said guide means about said second center, and
    washing means for washing said filter cloth at the position where said filter cloth does not oppose said rotor;
    the end portion of said guide means as viewed in the travelling direction of said caterpillar determining substantially the position of said take-out port;
    said guide means being actuated to guide said caterpillar and said rotor in such a manner as to enable adjustment of the gap therebetween at said take-out port.

2. The apparatus as set forth in claim 1, wherein said second center is closely adjacent said first center.

3. The apparatus as set forth in claim 1, further comprising
    roller means disposed between said guide means and said support means for effecting a smooth relative movement of said guide means relative to said support means when said guide means is rotatably displaced.

4. A continuous filtration/separation apparatus comprising
    a rotor rotating with a first center being as its center;
    a caterpillar having a portion opposed by said rotor and rotating along the rotating direction of said rotor;
    guide means for guiding said caterpillar in such a manner that said opposed portion advances while describing an arc having as its center a second center which is eccentric relative to said first center or a shape approximate to said arc;
    support means for supporting said guide means movably with said second center being as its center;
    an endless filter cloth passing between said rotor and said caterpillar;
    a feed port supplying a material for treatment into the gap between said filter cloth and said rotor;
    a take-out port for said material disposed at a position of a narrower width between said rotor and said filter cloth than the position of said feed port;
    side plates closing at least the portion ranging from said feed port to said take-out port, as viewed in the rotating direction of said rotor, from both side portions of said rotor to both end portions of said filter cloth;
    a plurality of vanes disposed retractably from and into the surface of said rotor and having their tips positioned close to said filter cloth and their both ends positioned close to said side plates;
    a base supporting both said rotor and said support means,
    driving means for driving said guide means to move with said second center being as its center;
    washing means for washing said filter cloth at the position where said filter cloth does not oppose said rotor;
    the end portion of said guide means as viewed in the travelling direction of said caterpillar determining substantially the position of said take-out port;
    said guide means being actuated to guide said caterpillar and said rotor in such a manner as to enable adjustment of the gap therebetween at said take-out port;
    said driving means comprises:
    a linear motion hydraulic actuator; and
    a lever mechanism having its support point pivoted to said base, its point of force being connected to said linear motion hydraulic actuator and its point of application being connected to said guide means and enabling said guide means to rotate with said second center being as its center by means of said linear motion hydraulic actuator.

* * * * *